United States Patent [19]

Veazey et al.

[11] Patent Number: 4,665,139

[45] Date of Patent: May 12, 1987

[54] PROCESS FOR POLYMERIZING A MONOMER CHARGE

[75] Inventors: Richard L. Veazey, East Windsor, N.J.; B. Timothy Pennington, Sulphur, La.

[73] Assignee: Cities Service Oil & Gas Corp., Tulsa, Okla.

[21] Appl. No.: 714,554

[22] Filed: Mar. 21, 1985

Related U.S. Application Data

[60] Continuation-in-part of Ser. No. 566,531, Dec. 29, 1983, abandoned, which is a division of Ser. No. 444,289, Nov. 24, 1982, Pat. No. 4,435,519.

[51] Int. Cl.$^4$ .......................... C08F 2/34; C08F 10/02
[52] U.S. Cl. ......................................... 526/86; 526/87; 526/88; 526/124; 526/129; 526/142; 526/144; 526/901
[58] Field of Search ..................... 526/87, 88, 97, 121, 526/124, 129, 142, 169.2, 86, 566, 531, 9 N

[56] References Cited

U.S. PATENT DOCUMENTS

| | | | |
|---|---|---|---|
| 3,202,645 | 8/1965 | Yance | 526/97 |
| 3,455,974 | 7/1969 | Su | 526/169.2 |
| 3,718,636 | 2/1973 | Stevens et al. | 526/129 |
| 3,787,384 | 1/1974 | Stevens et al. | 526/129 |
| 3,790,550 | 2/1974 | Miller | 526/901 |
| 3,925,338 | 12/1975 | Ort | 526/97 |
| 4,232,140 | 11/1980 | Ort | 526/124 |
| 4,256,865 | 3/1981 | Hgde et al. | 526/124 |
| 4,383,095 | 5/1983 | Goeke et al. | 526/175 |
| 4,435,519 | 3/1984 | Veazey et al. | 526/129 |

*Primary Examiner*—Edward J. Smith
*Attorney, Agent, or Firm*—John Wade Carpenter

[57] ABSTRACT

Process of polymerizing a monomer charge including ethylene by (1) drying an inorganic oxide having surface hydroxyl groups to form a support that is substantially free of adsorbed water, (2) reacting the surface hydroxyl groups of the support with at least a substantially stoichiometric amount of at least one organometallic compound corresponding to the formula $R_xMR'_yR''_z$, wherein M is a metal of Group III of the periodic table, R is an alkyl group containing 1 to 12 carbon atoms, R' and R'' are independently selected from the group consisting of H, Cl, and alkyl and alkoxy groups containing 1 to 12 carbon atoms, x has a value of 1 to 3, and y and z both represent values of 0 to 2, the sum of which is not greater than $3-x$, (3) reacting the thus-treated support with at least about 0.001 mol, per mol of organometallic compound, of at least one vanadium compound prepared by reacting one molar proportion of $VOCl_3$ and/or $VOBr_3$ with about 0.5 to 1 molar proportion of a diol corresponding to the formula HO-R-OH, wherein R is a divalent hydrocarbon radical having a chain length of 2 to 16 carbon atoms, (4) feeding the product into a gas-phase reaction zone, (5) feeding a trialkylaluminum into the gas-phase reaction zone in order to form a bed comprising the product and the trialkylaluminum, (6) fluidizing the bed with a gas mixture of ethylene, hydrogen and chloroform, (7) removing polymerized ethylene particles from the reaction zone, and (8) recycling unreacted gas mixture from the top of the reaction zone to the bottom of the reaction zone.

20 Claims, No Drawings

PROCESS FOR POLYMERIZING A MONOMER CHARGE

This is a continuation-in-part application of our co-pending application filed on Dec. 29, 1983 and having Ser. No. 566,531 now abandoned. Our co-pending application was a divisional application of an application which had Ser. No. 444,289 and a filing date of Nov. 24, 1982 and now U.S. Pat. No. 4,435,519.

BACKGROUND OF THE INVENTION

1. Field of the Invention

This invention relates to the polymerization of olefins. More particularly, this invention relates to a process having catalyst compositions which are useful for polymerizing one or more monomers comprising ethylene to polymers having an intermediate molecular weight distribution and a good balance of physical properties.

2. Description of the Prior Art

It is known that catalysts of the type variously described as coordination, Ziegler, Ziegler-type, or Ziegler-Natta catalysts are useful for the polymerization of olefins under moderate conditions of temperature and pressure. It is also known that the properties of the polymers obtainable by the use of such catalysts, as well as the relative economies of the processes used to prepare the polymers, vary with several factors, including the choice of the particular monomers, catalyst components, polymerization adjuvants, and other polymerization conditions employed.

During the years since Ziegler catalysts were first publicly disclosed, there has been a considerable amount of research conducted on the use of such catalysts; and numerous publications have resulted from that research. These publications have added much to the knowledge of how to make various types of olefin polymers by various types of processes. However, as is apparent from the amount of research on Ziegler catalysis that is still being conducted throughout the world, as well as the number of patents that are still being issued to inventors working in the field of Ziegler catalysis, the means of attaining certain results when polymerizing olefins with Ziegler catalysts are still frequently unpredictable. The fact that this situation exists is sometimes due to the need to obtain a previously-unattainable combination of results; occasionally due to difficulties in obtaining the same results in a commercial-scale apparatus as in a laboratory-scale reactor; and often due to a polymerization parameter's having an effect, or side-effect, in a given type of polymerization process that is different from effects achieved by its use in prior art processes of a different type.

One aspect of Ziegler catalysis in which the need for further research has been found to exist has been in the provision of catalyst compositions suitable for use in a commerically-feasible process for preparing ethylene polymers having a good balance of physical properties and a molecular weight distribution that can be controlled so as to make the polymers formable by whichever forming technique is intended to be employed for producing articles from the polymers, e.g., injection molding or blow molding.

There are, of course, known processes for preparing injection molding resins, as well as known processes for preparing blow molding resins, by polymerizing ethylene with the aid of Ziegler catalysts. However, the known processes typically suffer one or more of the disadvantages of lack of economy, inability to produce polymers having a suitable balance of properties, and/or unreliability in producing such polymers-particularly in commercial-scale operations. Moreover, the different molecular weight distribution requirements of polymers to be formed by different techniques have compounded the problem of finding a family of catalyst compositions suitable for use in a commercially-feasible process wherein the molecular weight distribution can be controlled so as to produce the desired polymers.

U.S. Pat. No. 4,003,712 by Miller teaches a gas-phase fluidized bed system and process which are capable of being scaled up to commercial size and, being solvent-free, would be less expensive than processes which use solvents or liquid diluents. However, Miller's silyl chromate catalyst does not give polymers of the desired molecular weight distribution and good balance of physical properties. His system contains some features which tend to shorten commercial "on-stream" time. He does not teach how to avoid polymer buildup on reactor surfaces, a phenomenon variously referred to as "coating", "fouling", or "sheeting".

What is still needed is a process employing a catalyst which (a) is suitable for use in a gas-phase polymerization process, (b) has sufficient activity to be economically attractive, (c) is capable of yielding polymers having a controlled molecular weight distribution and a good balance of physical properties, (d) does not cause reactor wall fouling, and (e) a gas-phase fluidized bed process which allows the catalyst to perform at its full potential at commercial scale.

British Pat. No. 1,489,410 (Monsanto) teaches gas-phase polymerization processes which, because of their use of supported Ziegler catalysts having a vanadium component and other factors, are commercially attractive processes. However, as taught in the patent, the processes are designed to result in the formation of polymers having the broad molecular weight distributions suitable for blow molding resins, i.e. molecular weight distributions such that their normalized $V_{30}/V_{300}$ melt viscosity ratios are above 2.3. Moreover, it has been found that these processes, although useful for preparing blow-molding resins of the type employed for household chemical containers, do not appear to be adaptable to the preparation of blow-molding resins requiring somewhat narrower molecular weight distributions, e.g., liquid food containers, or to the preparation of injection-molding resins requiring still narrower molecular weight distributions.

Attempts to make the processes of the Monsanto patent suitable for the preparation of injection molding resins, as well as more reliable in the preparation of desirable blow molding resins, by combining the teachings of the patents with the teachings of publications that discuss means of narrowing molecular weight distribution have not been successful. For example, polymers having a sufficiently narrow molecular weight distribution have not been obtained when Monsanto's preferred vanadium halides have been replaced with the alkoxy group-containing vanadium compounds which are within the scope of their patent and which U.S. Pat. Nos. 3,457,244 (Fukuda et al.) and 3,655,583 (Yamamoto et al.) teach to result in the production of polymers having narrower molecular weight distributions when unsupported catalyst systems are employed.

British Pat. No. 1,175,593 (Stamicarbon) teaches a process for preparing ethylene/higher alkene/polyunsaturated compound terpolymers by the use of an unsupported vanadium chloride/alkylaluminum halide catalyst system, the activity of which is increased by adding an alcohol or phenol to the vanadium compound and/or the aluminum compound. According to the speculative teachings of the patent, the alcohol may be a polyhydric alcohol in which the -OH groups are not attached to adjacent carbon atoms, but the patent does not mention any particular polyhydric alcohol that might be used or suggest the effect that the inclusion of a polyhydric alcohol might have on molecular weight distribution if the catalyst composition were being used for the preparation of crystallizable ethylene polymers, such as injection molding or blow molding resins, rather than the rubbers of the patent.

U.S. Pat. No. 3,202,645 to Yancey presents a process for polymerizing and copolymerizing alpha mono and di-olefins by catalysts comprising (a) the product of the reaction between a compound of a metal chosen from the group consisting of the metals of Group IIb and IIIb (where the group numbers correspond to the Mendeleev Periodic Table) and hydroxyl groups on the surface of a finely-divided particulate inorganic solid, preferably finely-divided silica or alumina, and (b) a halide-type compound of a Group IVa, V, VIa, VIIa, or period 4 of Group VIII metal. The polymerization or copolymerization reaction can be effected at suitable temperatures within the range of from about $-25°$ C. to about 250° C., and pressures ranging from below atmospheric upwardly to any desired maximum pressure, for example, 30,000 p.s.i.g. or even higher pressures. U.S. Pat. No. 3,718,636 to Stevens et al teaches obtaining polyolefins having a wide distribution of molecular weights through the use of a catalyst comprising an organometallic compound, and a solid complex component obtained by reacting a solid bivalent metal compound with an impregnation agent which consists of an organometallic compound, separating the solid reaction product, and reacting the solid reaction product with a halogenated derivative of a transition metal. Stevens et al teaches in U.S. Pat. No. 3,787,384 another catalyst suitable for use in olefin polymerization and olefin copolymerization which comprises (a) at least one organometallic compound, and (b) a solid catalytic component obtained by reacting a support composed of silica, alumina or both silica and alumina with a compound of the formula $MR_nX_{m-n}$ in which M is aluminum or magnesium, R is a hydrocarbon radical containing 1 to 20 carbon atoms, X is hydrogen or a halogen, m is the valence of M, and n is a whole number not less than 1 nor greater than m, separating the solid product of the reaction, reacting said product with an excess of a halogen-containing transition metal compound, and separating the solid reaction product.

U.S. Pat. No. 3,925,338 to Ort teaches that control of particle size of olefin polymers produced by gas-phase polymerization of at least one olefin using Ziegler-type catalysts deposited on solid supports in a fluidized-solids operation is effected by controlling the particle size of the catalyst support. U.S. Pat. No. 4,232,140 also to Ort discloses the use of trichlorofluoromethane as a promoter in the polymerization and copolymerization of ethylene with supported Ziegler-type vanadium compound/alkylaluminum compound catalysts in the presence of hydrogen. Ort finds that polymer yields with his supported vanadium-based catalysts are too low for commercial viability unless the catalyst is promoted to high yield with the trichlorofluoromethane promoter. The viscosity ratio data in Ort's examples, which may be related to molecular weight distribution, indicate that none of the polymers have narrow molecular weight distribution. Ort does not teach or suggest how to avoid reactor fouling.

U.S. Pat. No. 3,455,974 to Su teaches an organo-soluble fluorine-containing vanadium compound having the formula:

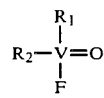

wherein $R_1$ and $R_2$ are alkoxy groups,

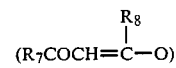

wherein $R_7$ and $R_8$ are lower alkyl, lower aryl or taken together, lower alkylene groups or $R_1$ and $R_2$ are collectively an ,αω-alkylene dioxy group, said compound having from 2 to 40 carbon atoms. Su also teaches a method of making an organo-soluble fluorine containing vanadium compound which comprises contacting and reacting one molar proportion of vanadyl trifluoride with two molar proportions of a compound having the formula:

in the presence of an inert aprotic solvent at about ambient temperature wherein $R_4$, $R_5$, and $R_6$ are alkoxy groups or where $R_4$ and $R_5$ collectively are an ,αω-alkylene dioxy group.

Although some of the foregoing patents are concerned with the production of polymers having narrow molecular weight distributions, none of the prior art teaches or suggests an economical, gas-phase, fluidized bed process and catalyst for commercially producing ethylene polymers of controlled molecular weight distribution in combination with a good balance of physical properties.

SUMMARY OF THE INVENTION

An object of the invention is to provide an economical commercial polymerization process for preparing ethylene polymers having a controlled molecular weight distribution and a good balance of physical properties.

Another object is to provide non-fouling catalyst compositions which are useful in an economical gas-phase process for polymerizing one or more monomers comprising ethylene to polymers having a controlled molecular weight distribution and a good balance of physical properties.

The foregoing objects of this invention are broadly accomplished by providing a process of polymerizing a monomer charge including ethylene comprising the steps of:

(a) drying an inorganic oxide having surface hydroxyl groups to form a support that is substantially free of adsorbed water;

(b) reacting the surface hydroxyl groups of the support with at least a substantially stoichiometric amount of at least one organometallic compound corresponding to the formula $R_xMR'_yR''_z$, wherein M is a metal of Group III of the periodic table, R is an alkyl group containing 1 to 12 carbon atoms, R' and R" are independently selected from the group consisting of H, Cl, and alkyl and alkoxy groups containing 1 to 12 carbon atoms, x has a value of 1 to 3, and y and z both represent values of 0 to 2, the sum of which is not greater than 3-x;

(c) reacting the thus-treated support with at least about 0.001 mol, per mol of organometallic compound, of at least one vanadium compound prepared by reacting one molar proportion of $VOCl_3$ and/or $VOBr_3$ with about 0.5 to 1 molar proportion of a diol corresponding to the formula HO-R-OH, wherein R is a divalent hydrocarbon radical having a chain length of 2 to 16 carbon atoms;

(d) feeding the product of step (c) into a gas-phase reaction zone;

(e) feeding, separately and independently of the feeding step (d), a trialkylaluminum into the gas-phase reaction zone in order to form a bed in the gas-phase reaction zone which comprises the product of step (c) and the trialkylaluminum;

(f) fluidizing the bed of step (e) at a pressure of between about 0.7 and 4.2 MPa and a temperature of between about 50° to 120° C. by diffusing underneath the bed of step (e) a gas mixture comprising ethylene, hydrogen, and chloroform at a rate sufficient enough to give a linear gas velocity in the bed of step (e) of between about 15 to 60 cm/sec;

(g) removing particulate polymerized substantially ethylene particles from the reaction zone; and (h) recycling unreacted gas mixture of step (f) from the top of the reaction zone to the bottom of the reaction zone.

DETAILED DESCRIPTION OF THE INVENTION

This invention is a novel process of polymerizing a monomer charge having ethylene. An inorganic oxide with surface hydroxyl groups is dried to form a support that is substantially free of adsorbed water. The surface hydroxyl groups of the support are reacted with at least a substantially stoichiometric amount of at least one organometallic compound corresponding to the formula $R_xMR'_yR''_z$, wherein M is a metal of Group III of the periodic table, R is an alkyl group containing 1 to 12 carbon atoms, R' and R" are independently selected from the group consisting of H, Cl, and alkyl and alkoxy groups containing 1 to 12 carbon atoms, x has a value of 1 to 3, and y and z both represent values of 0 to 2, the sum of which is not greater than 3-x. The thus-treated support is reacted with at least about 0.001 mol, per mol of organometallic compound, of at least one vanadium compound prepared by reacting one molar proportion of $VOCl_3$ and/or $VOBr_3$ with about 0.5 to 1 molar proportion of a diol corresponding to the formula HO-R-OH, wherein R is a divalent hydrocarbon radical having a chain length of 2 to 16 carbon atoms, in order to form a catalyst product. The catalyst product is fed into a gas-phase reaction zone. Separately and independently of this feeding, a trialkylaluminum is fed into the gas-phase reaction zone in order to form a bed in the gas-phase reaction zone which includes inter alia the catalyst product and the trialkylaluminum. The bed is fluidized at a pressure of between about 0.7 and 4.2 MPa and a temperature of between about 50° to 120° C. by diffusing underneath the bed of the catalyst product and trialkylaluminum a gas mixture comprising ethylene, hydrogen, and chloroform at a rate sufficient enough to give a linear gas velocity in the catalyst product-trialkylaluminum bed of between about 15 to 60 cm/sec. Particulate polymerized substantially ehtylene particles are moved from the reaction zone, and unreacted gas mixture of ethylene, hydrogen and chloroform is recycled from the top of the reaction zone to the bottom of the reaction zone.

The inorganic oxide used in preparing catalyst compositions of the invention may be any particulate inorganic oxide or mixed oxide, e.g., silica, alumina, silica-alumina, magnesia, zirconia, thoria, titania, etc., having surface hydroxyl groups capable of reacting with the organometallic compound. However, it is generally an inorganic oxide selected from the group consisting of silica, alumina, magnesia and mixtures thereof, i.e., physical mixtures, such as mixtures of silica and alumina particles, etc., and/or chemical mixtures, such as magnesium silicate, aluminum silicate, etc. The surface hydroxyl groups may be at the outer surface of the oxide particles or at the surfaces of pores in the particles, the only requirement in this regard being that they be available for reaction with the organometallic compound.

The specific particle size, surface area, pore volume, and number of surface hydroxyl groups characteristic of the inorganic oxide are not critical to its utility in the practice of the invention. However, since such characteristics determine the amount of inorganic oxide that it is desirable to employ in preparing the catalyst compositions, as well as sometimes affecting the properties of polymers formed with the aid of the catalyst compositions, these characteristics must frequently be taken into consideration in choosing an inorganic oxide for use in a particular aspect of the invention. For example, when the catalyst composition is to be used in a gas-phase polymerization process-a type of process in which it is known that the polymer particle size can be varied by varying the particle size of the support-the inorganic oxide used in preparing the catalyst composition should be one having a particle size that is suitable for the production of a polymer having the desired particle size. In general, optimum results are usually obtained by the use of inorganic oxides having an average particle size in the range of about 30 to 600 microns, preferably about 30 to 100 microns; a surface area of about 50 to 1000 square meters per gram, preferably about 100 to 400 square meters per gram; and a pore volume of about 0.5 to 3.5 cc per gram, preferably about 0.5 to 2 cc per gram.

As indicated above, the organometallic compound that is reacted with the surface hydroxyl groups of the inorganic oxide in the practice of the invention may be any one or more organometallic compounds corresponding to the formula $R_xMR'_yR''_z$, wherein M is a metal of Group III of the periodic table, R is an alkyl group containing 1 to 12 carbon atoms, R' and R" are independently selected from the group consisting of H, Cl, and alkyl and alkoxy groups containing 1 to 12 carbon atoms, x has a value of 1 to 3, and y and z both represent values of 0 to 2, the sum of which is not greater than 3-x. Thus, M may be, e.g. aluminum, gallium, indium, or thallium; R may be, e.g., methyl, ethyl, propyl, isopropyl, n-butyl, n-pentyl, isopentyl, t-pentyl, hexyl, 2-methylpentyl, heptyl, octyl, 2-ethylhexyl, nonyl, decyl, dodecyl, etc; R', when present, may be H, Cl, an alkyl group, such as one of those exemplified above for R, which is the same as or different from R, or an alkoxy group, such as the alkoxy groups corresponding to the aformentioned alkyl groups; and R″, when present, may be any of the substituents mentioned above as exemplary of R′ and may be the same as or different from R′.

The preferred organometallic compounds are those in which M is aluminum. Utilizable aluminum compounds include chlorides, such as dimethylaluminum chloride, diethylaluminum chloride, dipropylaluminum chloride, diisobutylaluminum chloride, the corresponding alkylaluminum dichlorides, etc., and mixtures of such chlorides, but the chlorides are generally not particularly preferred because of the halogen residue they contribute to polymers made in their presence. The more preferred aluminum compounds are the trialkylaluminums, dialkylaluminum hydrides, dialkylaluminum alkoxides, and alkylaluminum dialkoxides, such as trimethylaluminum, triethylaluminum, tripropylaluminum, tributylaluminum, triisobutylaluminum, isoprenylaluminum, trihexylaluminum, trioctylaluminum, tridecylaluminum, tridodecylaluminum, etc.; the corresponding alkoxy compounds wherein one or two of the alkyl groups have been replaced by alkoxy groups, such as ethylaluminum diethoxide, diethylaluminum ethoxide, ethylaluminum sesquiethoxide, ethylaluminum diisopropoxide, etc.; diethylaluminum hydride, di-n-propylaluminum hydride, diisobutylaluminum hydride, etc.; and mixtures of such compounds.

Especially preferred aluminum compounds are the trialkylaluminums, particularly triethylaluminum and tri-n-hexylaluminum, which are advantageous to employ because of their cost, availability, and/or effectiveness. When a trialkylaluminum is used as the organometallic compound it is generally found that—all other factors being constant—the molecular weight distributions of polymers prepared with the catalysts of the invention are narrowed as the chain length of the alkyl groups of the trialkylaluminum are lengthened.

The amount of organometallic compound employed is at least substantially the stoichiometric amount, i.e., the amount required to react with all of the available hydroxyl groups on the inorganic oxide. Use of an amount less than the substantially stoichiometric amount would broaden the molecular weight distributions of polymers formed in the presence of the catalyst compositions; use of an amount greater than the substantially stoichiometric amount is permissible within the scope of the invention but frequently serves no practical purpose and can be disadvantageous in that the excess organometallic compound sometimes leads to fouling of the polymerization reactor if not removed from the catalyst composition prior to the composition's being used.

When the number of available hydroxyl groups on the particular inorganic oxide being treated is not known, it can be determined by any conventional technique, e.g., by reacting an aliquot of the inorganic oxide with excess triethylaluminum and determining the amount of evolved ethane. Once the number of available hydroxyl groups on the inorganic oxide is known, the amount of organometallic compound to be employed is chosen so as to provide at least about one mol of organometallic compound per mol of available hydroxyl groups.

The vanadium component of the catalyst compositions of the invention may be any one or more compounds prepared by reacting one molar proportion of $VOCl_3$ and/or $VOBr_3$ with about 0.5 to 1 molar proportion of a diol corresponding to the formula OH-R-OH, wherein R is a divalent hydrocarbon radical having a chain length of 2 to 16 carbon atoms—the catalyst compositions containing the compounds prepared by the use of the higher ratios of $VOCl_3$ and/or $VOBr_3$ to diol generally providing polymers having narrower molecular weight distributions. As far as effectiveness of the catalyst compositions in controlling molecular weight distribution is concerned, it does not appear to matter if the R of the diol is a straight-chain alkylene group, i.e., $-(CH_2)_{2-16}-$, an alkylene group having one or more short or long branches preferably saturated aliphatic branches attached to one or more of the carbons in the chain of 2 to 16 carbon atoms, e.g., a group such as $-CH_2C(CH_3)_2CH_2-$, $-CH(CH_3)CH_2-$, $-CH[(CH_2)_5CH_3](CH_2)_{10}CH_2-$, etc., or the like. What does matter is the chain length of the divalent hydrocarbon radical, since the molecular weight distributions of polymers formed in the presence of the catalyst compositions of the invention narrow as that chain length is increased.

Thus, all other factors being constant, one chooses a vanadium compound prepared from a diol wherein R has a relatively short chain length when polymers having a relatively broad molecular weight distribution are desired and, conversely, a vanadium compound prepared from a diol having a relatively long chain length when polymers having a relatively narrow molecular weight distribution are desired. However, since, as indicated above, other variables, such as the chain length of an alkyl group attached to the metal of the organometallic compound, can be varied to broaden or narrow the molecular weight distributions of polymers prepared in the presence of the catalyst compositions, it is generally found possible to prepare polymers having desired molecular weight distributions in the blow molding or injection molding range with the preferred vanadium compounds of the invention, i.e., vanadium compounds prepared by reacting $VOCl_3$ with a diol corresponding to the formula HO-R-OH, wherein R is a straight- or branched-chain alkylene group containing 2 to 6 carbon atoms.

The amount of vanadium compound(s) employed in the practice of the invention may be varied considerably but is generally such as to provide at least about 0.001 molar proportion of vanadium compound per mol of organometallic compound. When the catalyst composition is to be prepared by the preferred process described below, wherein no washing step is utilized during or after preparation of the compositions, the amount of vanadium compound employed should not be substantially in excess of the amount capable of reacting with the treated support, i.e., about 1 mol of vanadium compound per mol of organometallic compound. Use of a greater amount would serve no practical purpose and could be disadvantageous in that the excess vanadium compound could lead to fouling of the polymerization reactor. However, a larger amount of vanadium compound may be employed when fouling of the reactor is not expected to be a problem and/or excess vanadium compound will be removed from the catalyst composition before the composition is used. In the practice of the invention, the amount of vanadium compound employed is generally not in excess of about 3 mols per mol of organometallic compound; and excellant results are obtained by the use of about 0.03 to 0.3 mol of vanadium compound per mol of organometallic compound, i.e., about 3 to 30 mols of organometallic compound per mol of vanadium compound.

As indicated above, the catalyst compositions of the invention are prepared by drying the inorganic oxide, reacting the dried inorganic oxide with the organometallic compound, and reacting the thus-treated support with the vanadium compound. The conditions under which the inorganic oxide is dried are not critical as long as they are adequate to provide an inorganic oxide that has surface hydroxyl groups and is substantially free of adsorbed water. However, it is ordinarily preferred to dry the inorganic oxide at about 100° to 1000° C., with or without a nitrogen or other inert gas purge, until substantially all adsorbed water is removed. Also, although improved results are obtained by the use of the catalyst compositions of the invention, regardless of the particular temperature at which the inorganic oxide is dried, the drying temperature has been found to have a negligible-to-noticeable effect on those results optimum results generally being obtained when the inorganic oxide has been dried at about 200°–600° C., but drying temperatures of about 500°–600° C. generally being preferred for optimum results when the inorganic oxide is alumina. The time required for drying of the inorganic oxide varies, of course, with the particular drying temperature used but is usually in the range of about 5–16 hours.

When the inorganic oxide has been substantially freed of adsorbed water, its surface hydroxyl groups may be reacted with the organometallic compound in any suitable manner, conveniently by (1) adjusting its temperature, if necessary, to the temperature at which the reaction with the organometallic compound is to be conducted, (2) slurrying it in an inert liquid hydrocarbon, generally a $C_4$–$C_8$ hydrocarbon, such as isobutane, pentane, isopentane, hexane, cyclohexane, heptane, isooctane, etc., and mixtures thereof with one another and/or with other materials commonly present in commercial distillation cuts having the desired boiling range, (3) adding a substantially stoichiometric amount of the organometallic compound in neat or solution form, and (4) maintaining the organometallic compound in intimate contact with the inorganic oxide, e.g., by agitating the slurry, for a time sufficient to ensure substantially complete reaction with the available hydroxyl groups, generally at least about 5 minutes. The reaction may be conducted with or without pressure and at ambient or reflux temperatures, depending on the particular organometallic compound employed, as will be readily understood by those skilled in the art. When the organometallic compound is added in solution form, it is generally preferred, though not required, that the solvent be the same inert liquid hydrocarbon as is already present in the slurry.

The reaction of the vanadium compound with the treated support may also be accomplished by conventional means, such as any of the techniques described in British Pat. No. 1,489,410, the teachings of which are incorporated herein by reference. However, it is most desirably accomplished simply by adding the vanadium compound in neat or solution form to the slurry of treated support and maintaining it in intimate contact with the treated support for a time sufficient to provide for substantially complete reaction, usually at least about 5 minutes and preferably about 10–60 minutes, although, actually, the reaction is virtually instantaneous.

When the vanadium compound, or one of the vanadium compounds, employed in the practice of the invention is a compound that the catalyst manufacturer has synthesized for that use, it is frequently convenient to add it to the slurry of treated support in the form of the total reaction mixture resulting from the synthesis, e.g., an inert liquid hydrocarbon solution of the desired vanadium compound and any by-products and/or unreacted starting materials.

After the vanadium component has been reacted with the other catalyst components, the resultant catalyst composition may or may not require further treatment to make it suitable for use, depending on the particular process that has been used to prepare the catalyst composition and the particular type of polymerization process in which it is to be used. For example, if the catalyst composition has been prepared by a type of process which results in its being already dry when reaction with the vanadium component has been accomplished, no further treatment is likely to be necessary if the composition is to be used in a gas-phase polymerization process; but slurrying of the composition in a suitable liquid medium may be desirable if it is to be used in a slurry or solution polymerization process. On the other hand, if the catalyst composition has been prepared by the preferred process described above, i.e., if the inorganic oxide has been slurried before the other components are added, it is already suitable for use in a slurry or solution polymerization process but will have to be dried to make it suitable for use in a gas-phase polymerization process. When the composition is to be dried, i.e., freed of any liquid medium used in its preparation, the drying may be achieved by any conventional technique, e.g., filtration, centrifugation, evaporation, blowing with nitrogen, etc. Commerical preparation of the catalyst of this invention is preferably carried out as taught by Rogers in U.S. Pat. No. 4,426,317.

Regardless of the particular technique used to prepare the catalyst compositions of the invention, it should be kept in mind that they are Ziegler catalysts and are therefore susceptible to poisoning by the materials, such as oxygen, water, etc., that are known to reduce or destroy the effectiveness of Ziegler catalysts. Accordingly, they should be prepared, stored, and used under conditions that will permit them to be useful as polymerization catalysts, e.g., by the use of an inert gas atmosphere, such as nitrogen.

The invention is particularly advantageous in that it provides catalyst compositions which (1) have the active ingredients chemically-attached to an inorganic oxide support, (2) are capable of producing ethylene polymers having a controlled molecular weight distribution and a good balance of physical properties by an economical gas-phase process that gives a high yield of polymer and (3) do not foul gas phase reactors. The fact that high yields of polymer can be obtained by the use of the catalyst compositions is particularly unexpected in that these high yields are attainable even when the catalyst compositions are prepared by the preferred process wherein no washing step is required or utilized during or after preparation of the compositions. Both experience in the field and the teachings of the prior art indicate that at least one washing step should be required in the preparation of such composition when high yield catalysts are desired.

After the catalyst composition of this invention is prepared, it is subsequently introduced into a gas-phase fluidized reactor similar to that taught by Miller in U.S. Pat. No. 4,003,712 which will be incorporated by reference herein. In a preferred embodiment of the invention, the diameter of the velocity reduction or disengaging zone at the top of Miller's reactor is enlarged and the cyclone and filter in the gas recycle system are eliminated for stable, long-term commercial operation. It should be understood that polymerization with the catalyst compositions of this invention may be conducted in any fluidized system which has a distribution plate means and allows a monomer gas to fluidize a bed including the catalyst compositions; allows unreacted monomer gas to be recycled from the top of the fluidized system back to the bottom of the fluidized system or for admixing with the monomer gas prior to its diffusing or passing through the fluidized bed; allows a polymer product to be withdrawn from the fluidized bed; allows catalyst and a trialkylaluminum to be added to the fluidized bed; and provides for the removal of the heat of polymerization. Size, shape, pressure rating, heat removal capability, and other factors can limit the polymer production capacity of the gas-phase fluidized-bed reaction systems of this invention. The process of this invention may be practiced in commercial facilities having production capacities of 50,000 to 250,000 metric tons per year or more. The process of this invention may also be practiced in laboratory scale reactors having a production capacity of from about 0.1 to 1.0 kg/hr or in pilot plant reactors having production capacities of from 5 to 500 kg/hr.

The catalyst composition of this invention should preferably be injected or fed to the fluidized bed system at a point between the distribution plate and about ⅞ of the height of the fluidized bed from the distribution plate of the reactor. More preferably, the catalyst composition is fed into the fluidized bed system at a point of between about ⅛ to about ½ of the height of the fluidized bed. Injection of the catalyst composition above about ⅛ of the height of the bed (as opposed to below ⅛ of the height) offers distribution of the catalyst composition throughout the entire ongoing fluidized bed to retard and/or preclude the formation of localized spots of high catalyst composition concentration which would result in the formation of "hot spots" at or near the distribution plate. A "hot spot" is a localized region in which the exothermic heat of polymerization is not dissipated before some polymer heats to the softening point of the polymer. Any introduction of the catalyst compositions of this invention at a point above about ⅞ of the height of the fluidized bed from the distribution plate of the reactor may lead to excessive carryover of the fresh catalysts of this invention into the gas recycle system. The rate of injection or rate of feed of the catalyst composition of this invention is any suitable rate which is equal to catalyst consumption in the polymerization process of this invention and generally depends on the size of the fluidized bed system. The rate of production of particulate polymerized substantially ethylene particles in the fluidized bed is partly determined by the rate of catalyst injection.

We have found that the rate of injection of the catalyst for our polymerization process is generally preferably at a rate that maintains the concentration of the vanadium in the fluidized bed between about 1/10 ppm to about 50 ppm based on weight of vanadium metal divided by total solids in the bed. More preferably, the rate of injection of the catalyst compositions is that which would maintain the concentration of vanadium in the fluidized bed between about 0.50 ppm to about 10 ppm; most preferably, between about 1 ppm to about 4 ppm. The fluidized bed is substantially particulate polymerized ethylene polymer particles formed by polymerization of the monomer(s) on the catalyst compositions of this invention.

In order for the catalyst composition of this invention to give high yield of polymer product per unit of vanadium component, we have discovered that it is necessary to add or inject at least one trialkylaluminum compound into the fluidized bed system as a co-catalyst. For a variety of reasons, it is preferred to add the trialkylaluminum compound, or the mixture of trialkylaluminum compounds, that is being used as co-catalyst directly to the fluidized bed separately and independently of the catalyst and at an injection point removed from the catalyst injection point. However, the process of the invention does not depend on the method of feeding the trialkylaluminum co-catalyst or the location of its injection point. The trialkylaluminum compounds of this invention may be fed to the fluidized bed as pure compounds, or in solution in a liquid hydrocarbon which will vaporize in the fluidized bed. Suitable hydrocarbon solvents include, but are not limited to, isobutane, isopentane, hexane, heptane, and mixtures thereof.

The trialkylaluminum of this invention may be any trialkylaluminum wherein the alkyl or combination of alkyl groups contain between 1 and about 36 carbon atoms. In a preferred embodiment of the invention, the alkyl group or combination of alkyl groups contain between 1 and about 12 carbon atoms. Suitable trialkylaluminum compounds have been found to include tri-methyl-, triethyl-, tri-i-butyl-, tri-n-hexyl-, tri-n-octyl- and ethyl-di-i-butylaluminum. It should be understood that trialkylaluminum compounds add ethylene, and alpha olefins to some extent, under the operating temperatures and pressures of the polymerization process of the invention. Thus, an ethyl group on aluminum may be inserted by ethylene to become a butyl group, etc. Therefore, there is no reason to believe or require that all alkyl groups on the aluminum be the same. There is every reason to believe that mixtures of trialkylaluminum compounds are generated during polymerization and are as effective as pure compounds. Since the exact composition of the alkyl groups on aluminum during the polymerization process of this invention is not known because of the ethylene insertion reaction, all of the trialkylaluminum species in the fluidized bed are referred to collectively for the purposes herein as "trialkylaluminum".

As was the case for the catalyst compositions of this invention, the rate of injection of the trialkylaluminum is also any suitable rate which is equal to the trialkylaluminum consumption in the polymerization process, and also depends on the size of the fluidized bed system. Polymer productivity from the polymerization process is not only determined by the rate of catalyst injection, but also from the rate of trialkylaluminum injection. Assuming that the trialkylaluminum compounds of this invention remain in the fluidized bed and assuming uniform distribution of trialkylaluminum throughout the fluidized bed, the molar concentration of trialkylaluminum may be calculated from the molar feed rate of the trialkylaluminum being fed into the fluidized bed reaction system and the withdrawal rate of the polymer product particles. Likewise, assuming uniform distribution of the catalyst composition throughout the fluidized bed, the molar concentration of the vanadium component of the catalyst composition may be calculated from the molar feed rate of the vanadium component of the catalyst composition being fed into the fluidized bed reaction system and the withdrawal rate of the polymer product particles. At stable, lined-out operating conditions, the ratio of the molar concentration of the trialkylaluminum to the molar concentration of the vanadium component in the bed of catalyst composition will asymptote to the ratio of the molar feed rate of the trialkylaluminum to the molar feed rate of the vanadium components of the catalyst compositions of this invention. For the catalyst composition of this invention, the injection rate of the trialkylaluminum should be such that the Al/V ratio in the fluidized bed of the molar concentration of the trialkylaluminum to the molar concentration of the vanadium component is between about 1 to about 5,000. We have found that the activity of the catalyst composition of the invention is maximized in a certain range of trialkylaluminum to vanadium molar ratio. Too little or too much trialkylaluminum suppresses the activity of the catalyst composition and the polymer production. It has been determined that a plot of the trialkylaluminum to vanadium molar ratio versus the catalyst (of this invention) activity possesses a generally flat peak and the optimum trialkylaluminum to vanadium molar ratio lies in the range of from about 2 to about 500, with from about 2 to 60 being the most preferred from the standpoint of minimizing catalyst residue levels in the polymer and trialkylaluminum cost. Therefore, the preferred injection rate of the trialkylaluminum into the fluidized bed system of this invention is that injection rate wherein the molar ratio in the fluidized bed of the molar concentration of the trialkylaluminum to the molar concentration of the vanadium composition is between about 2 to 500, and most preferably from about 2 to about 60.

The bed of particulate polymerized substantially ethylene particles, trialkylaluminum and the catalyst composition of this invention has to be fluidized at a pressure of between about 0.7 and 4.2 MPa and a temperature of between about 50° to 120° C. Fluidization is conducted by diffusing underneath the bed (and through the distribution plate) a gas mixture comprising ethylene, hydrogen and chloroform at a rate sufficient enough to give a linear gas velocity in the bed of between about 15 to about 60 cm/sec. The gas mixture will also include inert gas which is used to feed the catalyst compositions to the fluidized bed. A majority of the gas mixture is in the form of unreacted gas mixture that is recycled from the top of the reaction zone to the bottom of the fluidized bed of the reaction zone.

Although the catalyst compositions and the trialkylaluminum of this invention polymerize ethylene and other olefins over a wide range of temperatures, there is a practical limitation to the temperatures at which the gas-phase fluidized-bed process of this invention is commercially viable. For example, above about 120° C., ethylene polymers soften and tend to agglomerate in a fluidized bed, leading to formation of lumps, loss of fluidization, and onset of an inoperable condition. Below about 50° C., the production rate of commercial reactors becomes so low that the process is no longer profitable. It is generally desirable to operate near the highest temperature at which the polymer will not agglomerate in the bed with a temperature safety factor for small temperature upsets so that inoperable conditions are not encountered even briefly. Therefore, the preferred temperature range is from about 65-115 degrees C., with the range from about 75-110 degrees C. being most preferred.

The pressure at which the polymerization process of this invention is conducted is selected on the basis of desired commercial operation rather than upon some limitation of the catalyst. The catalysts of this invention will function at atmospheric, subatmospheric, or superatmospheric pressures. For economy of operation, one wishes to polymerize near the highest pressure for which the equipment is designed in order to maximize the production rate for the equipment. But, because commercial process equipment generally is more expensive with the higher pressure, there is a natural tendency to design commercial equipment for low pressures. These constraints lead to a commercial operating range of about 0.7-4.2 MPa. At the lower pressures, however, higher dwell or residence times in the reactor are required to reach high yields of polymer per unit of catalyst. At the higher pressures, there is little room to safely accommodate pressure upsets. These constraints lead to a preferred pressure range of about 1.6-3.9 MPa.

In order to provide sufficient mixing and agitation in the bed of polyethylene particles, trialkylaluminum and catalyst that "hot spots" will not develop, it is necessary that the flow rate of the gas mixture through the bed of polymer particles containing traces of the catalyst and the trialkylaluminum be sufficient to fluidize the particles. For the powdered polymer particles produced by the catalyst compositions of this invention, the minimum fluidization velocity, $G_{mf}$, has been determined to be about 15 cm/sec. As gas velocity increases, a point is reached at which the particles are largely swept out of the bed by the force of the rising gas (the transport velocity), which, for the particles of the present invention is about 4 $G_{mf}$, or 60 cm/sec. To provide some margin for operating error, the preferred velocity range is about 1.5-3.0 $G_{mf}$, or about 23-45 cm/sec, in contrast to the 3-5 Gmf range preferred by Miller in U.S. Pat. No. 4,003,712 for his catalysts.

The catalysts of this invention, under the commercial conditions described above, in the absence of a chain transfer agent, produce polymer of a molecular weight too high for conventional melt processing. Therefore, in the commercial practice of this invention the fluidizing gas mixture must contain hydrogen during polymerization to adjust the molecular weight (as determined by melt index) to the desired range for the product being produced. This is done by increasing the hydrogen/ethylene ratio to raise melt index (lower molecular weight), or reducing the ratio to produce the opposite effect. The catalyst compositions of this invention are sensitive to hydrogen, so it is generally not necessary to use more than 10% by vol. of hydrogen even to produce the highest melt index polymer. Furthermore, when used as described herein, altering the hydrogen/ethylene ratio to increase melt index does not cause a loss of production rate in a commercial plant within the range of melt indexes used for commercial polymers at this time. Preferably, the amount of hydrogen utilized in a preferred embodiment of the invention in order to control the molecular weight of the produced polymer is between about 0.10% to about 10.0% by volume of the total gas mixture volume.

The gas mixture has to have chloroform in order that the catalyst compositions of this invention can have their activity promoted. While other halogenated carbon compounds such as methylene chloride and fluorotrichloromethane may work as promoters, from the standpoints of promotion of catalyst activity, cost, availability, ease of handling, and catalyst promotion without causing reactor fouling, chloroform is clearly the compound of choice. Only small amounts are needed because of its effectiveness. Under the conditions of polymerization, it is a gas, and generally will be present in the recycle gas at concentrations between about 0.0001 to about 1.000% by vol. of the gas mixture. Since the preferred vol % ranges for hydrogen and chloroform are respectively between about 0.10 and about 10.0 between about 0.0001 and about 1.000, the remaining vol % for any given volume of the gas mixture would include ethylene and any of the inert gas which is used to feed the catalyst compositions to the fluidized bed in the reaction zone. In a preferred embodiment of the invention, ethylene preferably comprises between about 50.0 vol % and about 99.9 vol % of the gas mixture.

It appears that the molar ratio $CHCl_3/V$ is more useful in predicting and understanding its effect than the overall concentration in the gas, since it affects the catalyst's performance. The $CHCl_3/V$ ratio may vary from about 2 to about 5000. Because chloroform is relatively inexpensive and used in small amounts, there is no real economic incentive to minimize its use. However, there appears to be a maximum in the curve of catalyst activity vs. $CHCl_3/V$ ratio, with a broad optimum in the range of about 10–500. There also appears to be an interaction between the optima for $CHCl_3/V$ ratio and $Al/V$ ratio such that lower $CHCl_3V$ ratios are generally preferred when the $Al/V$ ratio is low, and higher $CHCl_3V$ ratios are generally preferred when the $Al/V$ is high. Other factors, such as impurity levels, may also cause a shift in the optimum $CHCl_3/V$ ratio or $Al/V$ ratio, but generally such factors will not shift the optima outside the preferred ranges.

We have found that, in order to control the density of the produced ethylene polymer, the gas mixture of ethylene, hydrogen and chloroform may include alpha olefins which will be copolymerized with the ethylene of the gas mixture. Although the catalyst compositions of this invention will copolymerize essentially any alpha olefin with ethylene, there is a practical limit to what can be effectively done in a gas-phase reaction. Generally, olefins having more than 8 carbon atoms have too low a vapor pressure to be used in high enough concentration to have much effect on density. Propylene, butene-1, hexene-1, 4-methylpentene-1, and octene-1 are among the alpha olefins useful in copolymerization with ethylene in this invention. Preferably, mixtures of alpha olefins having 3 to 8 carbon atoms are used in a preferred embodiment of this invention. By this process, polymers generally considered to be HDPE (densities of 0.940 or greater) and LLDPE (densities below 0.940) may be made equally well by adjusting comonomer concentration in the feed or other factors. The amount of comonomer needed is determined by the density of the polymer product being made. Generally, not less than 0.5 vol % of alpha olefin will be used and not more than 30 vol % of the alpha olefin will be utilized for any given volume of the gas mixture along with any of the inert gas and between about 0.10 vol % and about 10.0 vol % of hydrogen, between about 0.0001 vol % and about 1.000 vol % chloroform, and between about 50.0 vol % and about 99.4 vol % ethylene.

The catalyst compositions of this invention are preferably fed to the gas-phase fluidized-bed reactor as a dry particulate matter, such as, dry powder under the inert gas. Any gas that does not react with the catalyst is considered inert. Suitable inert gases include nitrogen, argon, and methane. Any device which can measure and convey a free flowing powder is suitable for feeding the catalyst, although the device must not allow monomer to enter the catalyst storage area of the feed device. Once the catalyst has been measured and delivered to the catalyst feed line, any good method of conveying it to the fluidized bed may be used. These include mechanical means such as screw conveyers, or gas conveying with inert gas or, as Miller teaches, with recycle gas from the reactor. Catalyst may be added continuously, semi-continuously, or discontinuously to the reactor. Continuous addition is preferred, but is virtually impossible at laboratory scale. Catalyst may be fed pure or may be diluted with any free-flowing particulate material such as pure, dry support or polymer powder from the reactor. In catalyst feeding, all that is really critical is that the catalyst be fed at a controlled rate and be dispersed in the bed before a "hot spot" develops.

The produced particulate polymerized substantially ethylene particles may be removed from the gas-phase reaction zone by any suitable means and at any suitable location. Preferably, the produced ethylene polymer particles are removed in accordance with the procedure described by Miller in U.S. Pat. No. 4,003,712. In a preferred embodiment of the invention, the produced ethylene polymer particles are removed from the gas-phase reaction zone above and in proximity to the distribution plate.

As has been mentioned, it is necessary to have good fluidization, good catalyst mixing, and good distribution of gas in the bed in order to avoid "hot spots" which cause lumps to form in the bed. These lumps themselves disturb fluidization so, once a lump forms, the tendancy for other lumps to form is enhanced. Eventually a reactor shut down is necessary because the process becomes inoperable.

Similarly, it is necessary for long-term, stable operation of commercial reactors that the surfaces of the reactor and distribution plate remain clean. If a polymer coating (fouling) builds up on a reactor surface, several undesirable things may happen. First, fouling on the distribution plate tends to perturb the desired gas distribution and restrict the ability to the polymer particles at the plate to move laterally. Both effects tend to produce "hot spots" at or near the distribution plate. Second, fouling on the reactor wall inhibits the normal downward motion of fluidized particles at the wall surface. Particles which "hang up" at a wall surface can generate "hot spots". Third, the wall coating may come loose in places, fall into the bed, and disrupt fluidization as any lump would do. Even worse, wall fouling usually is in the form of a "sheet" rather than a lump, and produces severe gas channelling in the bed if it falls off.

Although poor selection of operating conditions or poor operating techniques may lead to lump formation, it appears that fouling of reactor surfaces depends primarily on the catalyst used. Some catalysts tend to produce fouling, and some do not. At this time, insufficient experience has been gained to be able to predict with accuracy which catalyst compositions will foul and which will give stable operation for months without fouling reactor surfaces. Obviously, for economical commercial operation, the catalyst must not foul reactor surfaces. Fouling in a commercial reactor leads to "down time" with consequent loss of production and extra maintenance cost for cleaning. Thus, fouling will cause a gas-phase fluidized-bed process to lose its economic advantage over slurry processes.

The following examples are given to illustrate the invention and are not intended as a limitation thereof. In these examples, compositions and processes that are illustrative of the invention are distinguished from those that are outside the scope of the invention and are included only for comparative purposes by using an alphabetic designation for any example or run that is a comparative example and a numeric designation for the examples and runs that are illustrative of the invention. Yields given in the examples are measures of productivity in terms of the number of grams of polymer produced per gram of catalyst per hour, melt indices ($MI_2$) are those determined by ASTM test D-1238-65T using a 2160-gram weight, while the NVR values are "normalized" melt viscosity ratios determined by measuring the apparent viscosities of the polymers at 30 sec$^{-1}$ and 300 sec.$^{-1}$, respectively, at 200° C. in an Instron capillary rheometer and (2) normalizing them to $V_{30}=5$ by the equation.

$$NVR = \text{antilog } (0.14699 + 0.7897 \log V_{30} - \log V_{300})$$

where $V_{30}$ and $V_{300}$ are the measured apparent viscosities. This normalization permits comparison of the viscosity ratios of polymers having different $V_{30}$ values, since the unnormalized $V_{30}/V_{300}$ ratio is a function of $V_{30}$. The NVR is constant for any given catalyst over an $MI_2$ range of about 1–30, and only slight deviations occur outside of that range.

In the examples, the following procedures are used to prepare the catalyst compositions and polymers.

PREPARATION OF CATALYSTS

In the preparation of each of the catalysts, dry Davison 952 silica gel (a commercial inorganic oxide having a surface area of about 250–350 square meters per gram, a pore volume of about 1.5–1.7 cc per gram, and an average particle size of about 65–75 microns) by heating it under dry, deoxygenated nitrogen for about 16 hours at a temperature of about 225°–275° C. to provide an activated oxide containing about 1.4 mmols of available hydroxyl groups per gram. Cool the activated oxide to ambient temperature under a purified nitrogen blanket, suspend it in commercial hexane, add neat trialkylaluminum, and stir the resultant slurry for about 30 minutes. Then add a vanadium compound in neat or solution form, in the cases of the catalyst compositions of the invention, using a solution that has been obtained by reacting a diol with $VOCl_3$ in hexane. Stir the resultant slurry for an additional 30 minutes, allow the hexane and catalyst layers to separate, decant the clear hexane layer, and remove the remaining hexane under a nitrogen purge to produce a powdered solid catalyst. The particular ingredients used to prepare the catalysts and the amounts of trialkylaluminum and vanadium compounds added per gram of inorganic oxide are shown in the examples and/or tables.

SLURRY POLYMERIZATION

Charge 1.5 liters of dry hexane to a suitable autoclave under a dry, deoxygenated nitrogen atmosphere, add 1.1 cc of a 30% solution of triethyaluminum in heptane as an activator-scavenger, stir, and add a slurry of 0.1–0.4 gram of catalyst powder in, respectively, 1–4 ml of commerical hexane. Raise the temperature of the reactor to 85°–90° C., pressurize the reactor with enough hydrogen to achieve the production of a polymer having the desired melt index, add about 80–100 cc of liquid butene-1 as a comonomer, raise the reactor pressure to about 2.1 MPa with ethylene, and hold the pressure at that level throughout the polymerization by adding ethylene as needed. Immediately after pressurizing the reactor with monomer, add 5 cc of a 0.25% solution of chloroform in hexane as a promoter; and, at 15-minute intervals thereafter, add supplemental 5 cc aliquots of the promoter solution. After 30–60 minutes, stop the polymerization by venting the autoclave, opening the reactor, filtering the polymer from the liquid medium, and drying the polymer.

LABORATORY GAS-PHASE POLYMERIZATION

The laboratory apparatus consisted of a continuous polymerization reaction system essentially as depicted by Miller in the drawing of U.S. Pat. No. 4,003,712, with two exceptions: there was no filter in the gas recycle line, and the catalyst was fed to the reactor with nitrogen only. The reaction zone was 10 cm in diameter, 120 cm tall. Recycle gas passed through a velocity reduction or disengaging zone atop the reactor, through a cyclone separator, through a centrifugal compressor, and into the bottom of the reactor where the gas was distributed into the fluidized bed by a dispersion or distribution plate. Heat exchange was effected by circulating pressurized, tempered water through jacketing on the recycle gas piping. This system had a rated capacity of 450 g of polymer per hour. Generally, for catalyst screening studies, the system was operated as follows:

Introduce a stream or streams of ethylene, any comonomer(s), chloroform, and hydrogen to the reactor. Continuously withdraw unreacted or recycle gas from the top of the disengaging zone, pass it through a heat exchanger to maintain a bed temperature of about 95°–100° C., and introduce it at the bottom of the reactor at a rate sufficient to give a superficial velocity of about 25 cm/sec in the bed.

Introduce make-up monomer, chloroform, and hydrogen into the recycle gas line so as to maintain constant gas composition as detected by on-line analyzers and so as to maintain the reactor pressure at about 3.5 MPa and to provide about 40 mmols of chloroform per mmol of vanadium per hour, and feed fresh catalyst particles into the reactor below the top of the bed so as to provide a vanadium feed rate of one mmol per hour. Add triethylaluminum as a scavenger and cocatalyst during the polymerization so as to provide a triethylaluminum feed rate of 20 mmol per hour. Withdraw polymer product semi-continuously from the bottom of the bed at a rate such as to maintain a constant bed level. Take aliquots of withdrawn polymer for testing.

EXAMPLE I

Prepare ten catalyst compositions by the catalyst preparation procedure described above. Then use each of the catalyst compositions to prepare an ethylene/butene-1 copolymer by the slurry polymerization procedure described above. The amounts of ingredients employed in the production of the catalyst compositions, and the yields, melt indices, and normalized viscosity ratios (NVR), i.e., molecular weight distributions, of the polymers are shown in Table I.

TABLE I

| RUN # | CATALYST COMPOSITION | YIELD | $MI_2$ | NVR |
|---|---|---|---|---|
| A | $VOCl_3/Al(C_2H_5)_3/SiO_2$<br>0.1 mmol 1.4 mmol 1 g | 600 g | 0.6 | 2.55 |
| B | $C_2H_5OVOCl_2/Al(C_2H_5)_3/SiO_2$<br>0.1 mmol 1.4 mmol 1 g | 288 g | 0.3 | 2.54 |
| C | $n\text{-}C_6H_{13}OVOCl_2/Al(C_2H_5)_3/SiO_2$<br>0.1 mmol 1.4 mmol 1 g | 280 g | 0.4 | 2.49 |
| D | $n\text{-}C_8H_{17}OVOCl_2/Al(C_2H_5)_3/SiO_2$<br>0.1 mmol 1.4 mmol 1 g | 290 g | 0.2 | 2.57 |
| 1 | $[HO(CH_2)_2OH + VOCl_3]/Al(C_2H_5)_3/SiO_2$<br>0.2 mmol 0.4 mmol 1.5 mmol 1 g | 653 g | 0.1 | 2.61 |
| 2 | $[HO(CH_2)_3OH + VOCl_3]/Al(C_2H_5)_3/SiO_2$<br>0.05 mmol 0.1 mmol 1.5 mmol 1 g | 313 g | 5.9 | 2.33 |
| 3 | $[HO(CH_2)_3OH + VOCl_3]/Al(C_2H_5)_3/SiO_2$<br>0.2 mmol 0.4 mmol 1.5 mmol 1 g | 997 g | 0.7 | 2.31 |
| 4 | $[HOCH_2C(CH_3)_2CH_2OH + VOCl_3]/Al(C_2H_5)_3/SiO_2$ 0.2 mmol 0.4 mmol 1.5 mmol 1 g | 993 g | 1.6 | 2.39 |
| 5 | $[HO(CH_2)_4OH + VOCl_3/Al(C_2H_5)_3/SiO_2$<br>0.2 mmol 0.4 mmol 1.5 mmol 1 g | 455 g | 0.2 | 2.27 |
| 6 | $[HO(CH_2)_6OH + VOCl_3]/Al(C_2H_5)_3/SiO_2$<br>0.2 mmol 0.4 mmol 1.5 mmol 1 g | 818 g | 1.9 | 2.16 |

As demonstrated above, (A) the molecular weight distribution of ethylene polymers prepared in the presence of catalyst composition of the type taught in British Pat. No. 1,489,410 are substantially unaffected by (1) the substitution of an alkoxy group-containing vanadium compound, i.e., the reaction product of a monohydroxy alcohol with vanadium oxytrichloride, for vanadium oxytrichloride or (2) alterations in the chain lengths of the alkoxy groups of the alkoxy group-containing vanadium compounds but (B) replacement of the vanadium oxytrichloride or alkoxyvanadium oxydichloride with a reaction product of vanadium oxytrichloride and a diol permits the polymer molecular weight distribution to be controlled by varying the length of the carbon chain separating the -OH groups broader molecular weight distributions being obtained when that chain is shortened and narrower molecular weight distributions being obtained when that chain is lengthened. The following two examples show that the catalyst compositions of the prior art and of the present invention affect polymer molecular weight distributions in substantially the same way when used in gas-phase processes for the polymerization of ethylene with or without alpha-olefin comonomers.

EXAMPLE II

Repeat Example I except for using each of the ten catalyst compositions to prepare an ethylene/propylene copolymer by the laboratory gas-phase polymerization procedure described above. Similar results are observed, the substitution of an alkoxyvanadium dichloride for vanadium oxytrichloride having no significant effect on polymer molecular weight distribution, but the substitution of a vanadium oxytrichloride/diol reaction product permitting control of polymer molecular weight distribution by varying the length of the carbon chain separating the -OH groups without reactor fouling.

EXAMPLE III

Repeat Example II except for employing no propylene in the laboratory gas-phase polymerization process. Similar results in the abilities of the catalysts compositions to control polymer molecular weight distribution without reactor fouling are observed.

EXAMPLE IV

Prepare two catalyst compositions by the catalyst preparation procedure described above, and use each of the compositions to prepare an ethylene/butene-1 copolymer by the slurry polymerization procedure which is also described above. The amounts of ingredients employed in the production of the catalyst compositions, and the melt indices and NVR values of the polymers are shown in Table II.

TABLE II

| RUN # | CATALYST COMPOSITION | $MI_2$ | NVR |
|---|---|---|---|
| 7 | $[HO(CH_2)_3OH + VOCl_3]/Al(C_2H_5)_3SiO_2$<br>0.2 mmol 0.4 mmol 1.5 mmol 1 g | 0.7 | 2.31 |
| 8 | $[HO(CH_2)_3OH + VOCl_3]/Al(C_2H_5)_3/SiO_2$<br>0.2 mmol 0.2 mmol 1.5 mmol 1 g | 0.3 | 2.59 |

The preceding example shows that variations in the diol/vanadium oxytrihalide mol ratios employed in preparing the catalyst compositions of the invention can be used as an additional means of controlling polymer molecular weight distribution—narrower molecular weight distribution being obtained with lower diol/-$VOX_3$ mol ratios. The following example demonstrates another means of further controlling polymer molecular weight distribution, i.e., varying the organometallic compounds used as components of the catalyst compositions. As shown therein, an increase in the chain length of alkyl groups attached to the Group III metal of the organometallic compound results in a narrowing of the molecular weight distributions of polymers formed in the presence of catalyst compositions of the invention.

EXAMPLE V

Prepare two catalyst compositions by the catalyst preparation procedure described above, and use each of the compositions to prepare an ethylene/butene-1 copolymer by the slurry polymerization procedure which is also described above. The ingredients employed in the production of the catalyst compositions, the amounts used, and the yields, melt indices, and NVR values of the polymers are shown in Table III.

TABLE III

| Run # | Catalyst Compositions | Yield | MI$_2$ | NVR |
|---|---|---|---|---|
| 9 | [VOCl$_3$ + HO(CH$_2$)$_6$OH]/ Al(C$_2$H$_5$)$_3$/SiO$_2$ 0.4 mmol 0.2 mmol 1.5 mmol 1 g | 818 g | 1.98 | 2.16 |
| 10 | [VOCl$_3$ + HO(CH$_2$)$_6$OH]/ Al(C$_6$H$_{13}$)$_3$/SiO$_2$ 0.2 mmol 0.1 mmol 1.5 mmol 1 g | 372 g | 11.7 | 2.02 |

EXAMPLE E

An attempt was made to essentially repeat Example III of U.S. Pat. No. 4,232,140 using the laboratory gas-phase polymerization method described above with Ort's catalyst and CFCl$_3$ promoter, operating the equipment continuously 24 hours a day. After two days, and before the reaction had lined out sufficiently to get a good sample of the desired product for comparison with the products made by the catalysts of this invention, the reactor became inoperable. After the reaction system had been shut down, the reactor was opened. The reactor walls and distribution plate were found to be fouled (coated with polymer) to the extent that normal fluidization could not be maintained.

The reactor was thoroughly cleaned, and the attempt repeated. This time, the reactor "fouled out" in about one day. A third attempt to run this catalyst and CFCl$_3$ promoter on a continuous basis was similarly unsuccessful.

EXAMPLE F

A batch of catalyst having the composition of the catalyst of run 2 (Table I) is prepared as a dry powder according to Rogers, U.S. Pat. No. 4,426,317, and used in the laboratory gas phase polymerization procedure described above, using ethylene as the only monomer. By adjusting concentrations of hydrogen and chloroform, and feed rates of catalyst and a 3% solution of triethylaluminum co-catalyst in hexane, the reaction and polymer properties stabilize after 36 hours of continuous operation to give 400 g/hr of polyethylene product of 1.0 melt index and an NVR of 2.3.

After stability has been reached, the hydrogen feed is discontinued. Gradually, the hydrogen/ethylene ratio drops, as determined by an on-line gas analyzer, as recycle gases are lost from the reaction zone through purge to the instruments and by being removed with the polyethylene product and no fresh hydrogen is added to the make-up gases. As the hydrogen level in the recycle gas decreases, the polymer melt index drops until it is unmeasurably low. The polymerization rate, as determined by ethylene uptake and by product removal from the reaction zone is unchanged, within experimental error. There is no external evidence of fouling. Hydrogen flow is then restarted, and the original hydrogen/ethylene ratio re-established as quickly as possible. Within 12 hours, the melt index is again 1.0.

With the reactor restabilized, the chloroform feed is discontinued. Gradually, the CHCl$_3$/V ratio decreases as the CHCl$_3$ (promoter) concentration in the recycle gas becomes lower due to loss of recycle gas from the system and the make-up gas being promoter-free. There is no change in the melt index of the polymer, but the polymerization rate drops to less than 40 g/hr. At this point, the catalyst and triethylaluminum feeds are discontinued to avoid having too much catalyst and co-catalyst in the reactor. Then, chloroform feed is cautiously restarted. Polymerization rate picks up immediately, as judged from an increase in both bed temperature and polymer powder production. Only after the chloroform reaches its original level in the recycle gas are the catalyst and triethylaluminum feeds restarted. About 36 hours after chloroform is re-admitted to the reaction, the reactor and polymer are restabilized to the original conditions of 400 g/hr rate and 1.0 melt index.

Then the triethylaluminum feed is stopped. For about 2 hours, no change is seen, but then the polymerization rate begins to decrease dramatically. When the polymerization rate reaches about 100 g/hr, the triethylaluminum feed is restarted at the original rate. Within an hour, an increase in polymer production can be noted, and within about 24 hours the reaction is restabilized at the original condition.

The reaction is then terminated intentionally, and the reactor opened for inspection. There is no visible coating or fouling on the distribution plate or reactor walls.

EXAMPLE VI

A commercial gas-phase fluidized-bed polymerization is carried out in a polymerization system in which the reaction zone is 3.6 m in diameter and about 15 m tall. Recycle gas rate is sufficient to give a gas velocity in the bed of about 30 cm/sec. The polymerization is conducted at 3.5 MPa pressure and 93 degrees C. average bed temperature. The catalyst has the same formulation as in Example I run 5, but is made in commercial batches of 450 kg each.

The polymer, produced from a recycle gas consisting essentially of ethylene, hydrogen, nitrogen, and chloroform at a rate of about 8.5 metric tons per hour, is a sheet grade, has an average melt index of 0.7, an average density of 0.964, and an NVR of 2.3 plus or minus 0.1.

Similar results in the narrowing of the molecular weight distribution of ethylene polymers are obtained when the examples are repeated except that the catalyst components, component proportions, comonomers, comonomer proportions, and/or polymerization conditions specified in the examples are replaced with other catalyst components, component proportions, comonomers, comonomer proportions, and/or polymerization conditions taught to be their equivalent in the specification.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

What is claimed is:

1. A process of polymerizing a monomer charge comprising chloroform, ethylene and hydrogen comprising the steps of:
   (a) drying an inorganic oxide selected from the group consisting of silica, alumina, magnesia, and mixtrues thereof, having surface hydroxyl groups to form a support that is substantially free of adsorbed water;
   (b) reacting the surface hydroxyl groups of the support with a substantially stoichiometric amount of at least one organometallic compound corresponding to the formula $R_xAlR'_yR''_z$ wherein R is an alkyl group containing 1 to 12 carbon atoms, R' and R" are independently selected from the group consisting of H, and alkyl and alkoxy groups containing 1 to 12 carbon atoms, x has a value of 1 to 3, and y and z each can have a value of 0 to 2 and the sum of y and z is not greater than 3−x, to provide a treated support;

(c) reacting the thus-treated support with from between about 0.001 to about 3 mols, per mol of organometallic compound, of at least one vanadium compound prepared by reacting one molar proportion of VOCl$_3$ and/or VOBr$_3$ with from about 0.5 to 1 molar proportion of a diol corresponding the formula HO—R'''—OH, whereid R''' is a divalent hydrocarbon radical having a chain length of 2 to 16 carbon atoms; and (d) contacting in a gas-phase reaction zone containing a trialkylaluminum activator the catalyst product of step (c) with said monomer charge comprising chloroform, ethylene, and hydrogen to produce a high yield polymerized monomer having a controlled molecular weight distribution.

2. The process of claim 1 additionally comprising removing particulate substantially polymerized monomer particles from the reaction zone having a controlled molecular weight distribution.

3. The process of claim 1 wherein said contacting in a gas-phase reaction zone is without having washed the catalyst product.

4. The process of claim 2 additionally comprising recycling unreacted monomer charge from the top of the reaction zone to the bottom of the reaction zone.

5. The process of claim 3 additionally comprising recycling unreacted monomer charge from the top of the reaction zone to the bottom of the reaction zone.

6. A process of polymerizing a monomer charge comprising chloroform, ethylene and hydrogen comprising the steps of:

(a) drying an inorganic oxide selected from the group consisting of silica, alumina, magnesia, and mixtures thereof, having surface hydroxyl groups to form a support that is substantially free of adsorbed water;

(b) reacting the surface hydroxyl groups of the support with a substantially stoichiometric amount of at least one organometallic compound corresponding to the formula $R_xALR'_yR''_z$ wherein R is an alky group containing 1 to 12 carbon atoms, R' and R'' are independently selected from the group consisting of H, and alkyl and alkoxy groups containing 1 to 12 carbon atoms, x has a value of 1 to 3, and y and z each can have a value of 0 to 2, the sum of y and z is not greater than 3−x, to provide a treated support;

(c) reacting the thus-treated support with from about 0.001 to about 3 mols, per mol or organometallic compound, of at least one vanadium compound prepared by reacting one molar proportion of VOCl$_3$ and/or VOBr$_3$ with about 0.5 to 1 molar proportion of a diol corresponding to the formula HO—R'''—OH wherein R''' is a divalent hydrocarbon radical having a chain length of 2 to 16 carbon atoms; and (d) contacting in a gas-phase reaction zone containing a trialkylaluminum activator, without washing the catalyst product of step(c), the catalyst product with a monomer charge comprising chloroform, ethylene, and hydrogen to produce a high yield polymerized monomer having a controlled molecular weight distribution.

7. The process of claim 6 additionally comprising removing particulate substantially polymerized monomer particles from the reaction zone having a controlled molecular weight distribution.

8. The process of claim 7 additionally comprising recycling unreacted monomer charge from the top of the reaction zone to the bottom of reaction zone.

9. The process of claim 1 or 6 wherein the organometallic compound is a trialkylaluminum.

10. The process of claim 1 or 6 wherein the organometallic compound is triethylaluminum.

11. The process of claim 1 or 6 wherein the organometallic compound is tri-n-hexylaluminum.

12. The process of claim 1 or 6 wherein the vanadium compound is the reaction product of VOCl$_3$ and a diol corresponding to the formula HO—R'''—OH, wherein R''' is an alkylene radical containing 2 to 6 carbon atoms.

13. The process of claim 1 or 6 wherein the amounts of materials employed in its preparation are such as to provide, as starting materials, about 3 to 30 mols of organometallic compound per mol of vanadium compound.

14. The process of claims 1 or 6 wherein the amount of organometallic compound reacted with the surface hydroxyl groups of the support is the substantially stoichiometric amount.

15. A process of polymerizing a monomer charge comprising chloroform, ethylene and hydrogen comprising the steps of:

(a) drying at between 100° C. to 1000° C. a silica support having surface hydroxyl groups to form a support that is substantially free of adsorbed water;

(b) reacting the surface hydroxyl groups of the support with a substantially stoichiometric amount of triethylaluminum per gram of silica support, to provide a treated support;

(c) reacting the thus-treated support with from about 0.001 to about 3 mols, per mol of triethylaluminum compound, of at least one vanadium compound prepared by reacting one molar proportion of VOCl$_3$ and/or VOBr$_3$ with from about 0.5 to 1 molar proportion of a diol corresponding to the formula HO—R—OH, wherein R is a divalent hydrocarbon radical having a chain length of 2 to 16 carbon atoms;

(d) contacting in a gas-phase reaction zone containing a trialkylaluminum activator, without washing the catalyst product of step (c), the catalyst product with a monomer charge comprising chloroform, ethylene, and hydrogen to produce a high yield polymerized monomer having a controlled molecular weight distribution without fouling the gas-phase reaction zone.

16. The process of claim 15 additionally comprising removing particulate substantially polymerized monomer particles from the reaction zone having a controlled molecuclar weight distribution.

17. The process of claim 16 additionally comprising recycling unreacted monomer charge from the top of the reaction zone to the bottom of the reaction zone.

18. The process of claims 1, 6 or 15 wherein said monomer charge additionally comprises at least one alpha-olefin containing 3 to 8 carbon atoms.

19. A process of polymerizing a monomer charge comprising chloroform, hydrogen, and ethylene in a gas-phase, fluidized bed, reaction zone which comprises a bed of particulate substantially polymerized ethylene particles and is under operating conditions for polymerizing ethylene using the monomer charge, said process comprising the steps of:
- (a) drying at from about 100° C. to about 1000° C. an inorganic oxide having surface hydroxyl groups to form a support that is substantially free of adsorbed water;
- (b) cooling the dried inorganic oxide of step (a) to ambient temperature;
- (c) reacting the surface hydroxyl groups of the support with a substantially stiochiometric amount of at least one compound corresponding to the formula RAlR'R" wherein at least one of the R, R' and R" substituents is an alkyl group containing 1 to 12 carbon atoms and the remaining substituents are independently selected from the group consisting of hydrogen, and alkyl and alkoxy groups containing 1 to 12 carbon atoms, to provide a treated support;
- (d) reacting the thus-treated support with from about 0.001 mol to about 3 mols, per mol of RAlR'R" compound, of at least one vanadium compound prepared by reacting one molar proportion of VOCl$_3$ and/or VOBr$_3$ with from about 0.5 to 1 molar proportion of a diol corresponding to the formula HO—R'''—OH, wherein R''' is a divalent hydrocarbon radical having a chain length of 2 to 16 carbon atoms;
- (e) drying the product of step (d);
- (f) feeding the product of step (e) into a gas-phase reaction zone in order to form part of the bed in the fluidized-bed reaction zone;
- (g) feeding, separately and independently of said feeding step (f), into the gas-phase reaction zone a trialkylaluminum such that such bed in the gas-phase reaction zone comprises the product of step (d), the trialkylaluminum, and particulate substantially polymerized ethylene particles;
- (h) fluidizing the bed step (g) at a temperature from 50° C. to about 120° C. by introducing into the reaction zone a gas mixture comprising ethylene, hydrogen, and chloroform;
- (i) removing particulate substantially polymerized ethylene particles from the reaction zone having a controlled molecular weight distribution; and
- (j) recycling unreacted gas mixture of step (h) from the top of the reaction zone, through a heat exchanger means, and into the bottom of the reaction zone.

20. A process of polymerizing a monomer charge comprising an alpha olefin, chloroform, hydrogen, and ethylene in a gas-phase, fluidized bed, reaction zone which comprises a bed of particulate substantially polymerized ethylene particles and is under operating conditions for polymerizing ethylene using the monomer charge, said process comprising the steps of:
- (a) drying at from about 100° C. to about 1000° C. an inorganic oxide having surface hydroxyl groups to form a support that is substantially free of adsorbed water;
- (b) cooling the dried inorganic oxide of step (a) to ambient temperature;
- (c) reacting the surface hydroxyl groups of the support with a substantially stoichiometric amount of at least one comcompound corresponding to the formula RAlA'R" wherein at least one of the R, R', and R" substituents is an alkyl group containing 1 to 12 carbon atoms and the remaining substituents are independently selected from the group consisting of hydrogen and alkyl and alkoxy groups containing 1 to 12 carbons;
- (d) reacting the thus-treated support with from about 0.001 mol to about 3 mols, per mol RAlR'R" compound, of at least one vanadium compound prepared by reacting one molar proportion of a diol corresponding to the formula HO—R'''—OH, wherein R''' is a divalent hydrocarbon radical having a chain length of 2 to 16 carbon atoms;
- (e) drying the product of step (d);
- (f) feeding the product of step (e) into a gas-phase reaction zone in order to form part of the bed in the fluidized-bed reaction zone;
- (g) feeding, separately and independently of said feeding step (f), into the gas-phase reaction zone a trialkylaluminum such that such bed in the gas-phase reaction zone comprises the product of step (d), the trialkylaluminum, and particulate substantially polymerized ethylene particles;
- (h) fluidizing the bed of step (g) at a temperature from about 50° C. to about 120° C. by introducing into the reaction zone a gas mixture comprising an alpha olefin, ethylene, hydrogen, and chloroform;
- (i) removing particulate substantially polymerized ethylene particles from the reaction zone having a controlled molecular weight distribution; and
- (j) recycling unreacted gas mixture of step (h) from the top of the reaction zone, through a heat exchanger means, and into the bottom of the reaction zone.

* * * * *